March 14, 1967 — J. A. MYERS — 3,308,719
MODULAR DISPENSER FOR AIRCRAFT CARRIED DEVICES
Filed Dec. 3, 1964 — 2 Sheets-Sheet 1
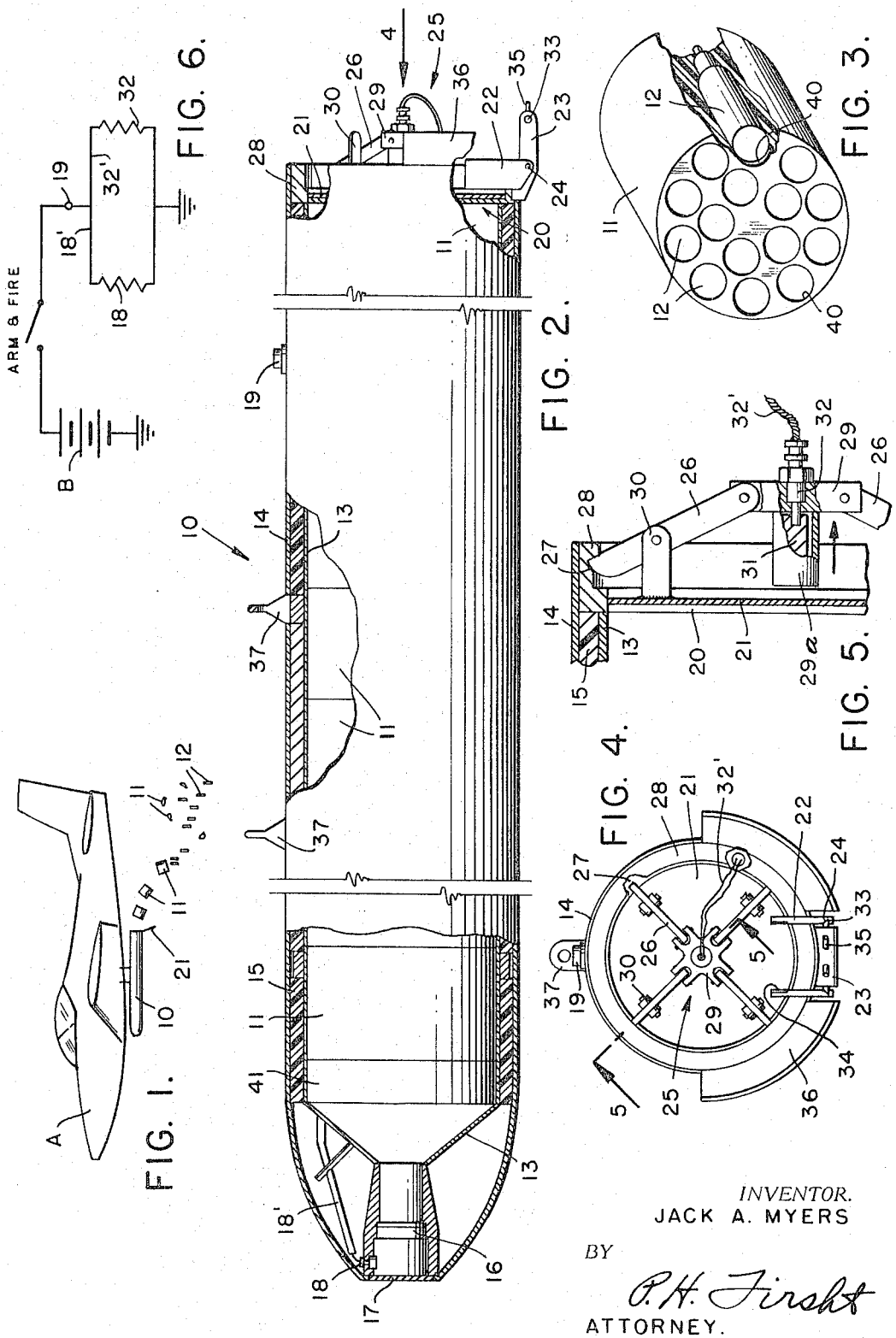
INVENTOR.
JACK A. MYERS
BY
P. H. Firsht
ATTORNEY.

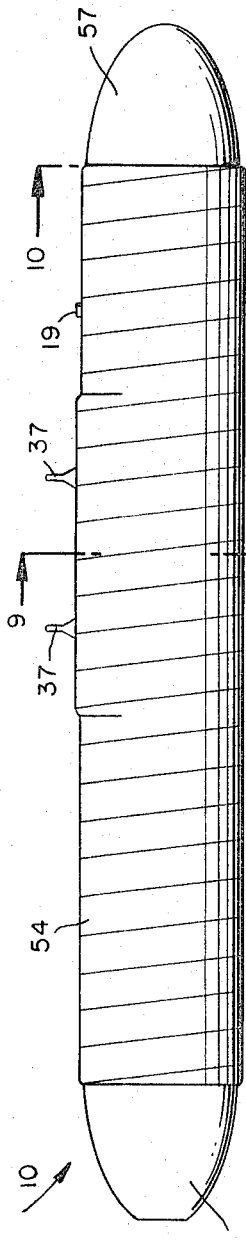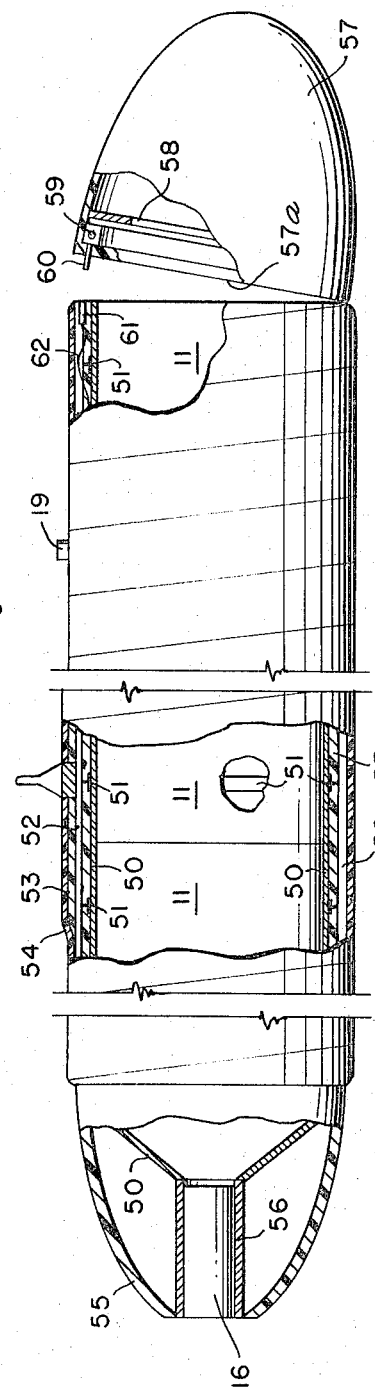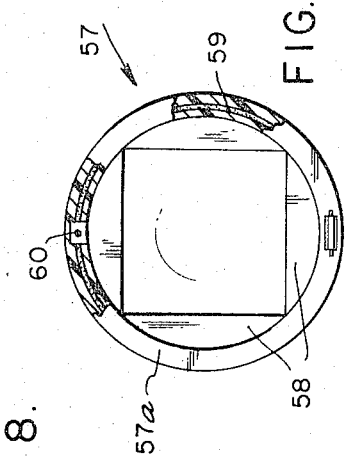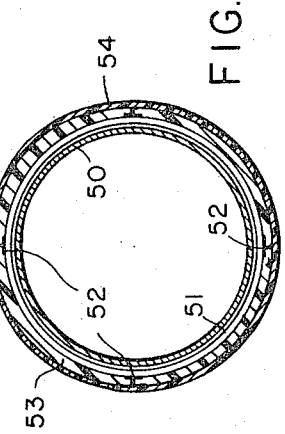
INVENTOR.
JACK A. MYERS

United States Patent Office 3,308,719
Patented Mar. 14, 1967

3,308,719
MODULAR DISPENSER FOR AIRCRAFT
CARRIED DEVICES
Jack A. Myers, Ridgecrest, Calif., assignor to the United States of America as represented by the Secretary of the Navy
Filed Dec. 3, 1964, Ser. No. 415,828
3 Claims. (Cl. 89—1.5)

The invention described herein may be manufactured and used by or for the Government of the United States of America for governmental purposes without the payment of any royalties thereon or therefor.

The present invention relates generally to airborne delivery systems and more particularly to a system which utilizes ram-air for delivering multiple or cluster-type payloads from airborne vehicles.

In the past, various systems and devices have been utilized for delivering cluster-type payloads from airborne aircraft. Such systems often include a multiple payload supporting cluster of rails or tubes "slung" beneath a transporting aircraft for supporting a plurality of individual payloads. Various means also have been employed for ejecting the payloads from the rails and tubes, including explosive devices, mechanical "drop" mechanisms and the like. However, those concerned with the development of mass-ejection techniques for dispensing and dispersing multiple or cluster-type payloads have found known techniques and devices to be particularly unsuited to certain operative conditions. For example, in certain combat situations it may be required that the payloads be varied in size, shape, and nature, depending upon the particular sortie flown, and that aircraft loading time be minimized, even while utilizing relatively inexperienced ground crews.

Heretofore, known devices have been capable of handling only limited types of payloads and have not been found to be completely reliable. Further, the loading of the known devices often require an extensive period of time, and frequently requires skilled personnel to perform the loading operations. These limitations are imposed due to the fact that aircraft-mated individual tubes and rails normally must be separately loaded, and necessary electrical continuity checks must be made before the aircraft can be launched.

Therefore, it is the purpose of the instant invention to provide a simple and reliable method and system, which is capable of handling a substantially unlimited range of practical payloads and which may be rapidly loaded and effectively operated, even when utilizing a relatively unskilled crew of servicing and flight personnel.

An object of the instant invention is to provide a selectively operable system for dispensing a plurality of individual payloads from an airborne vehicle.

Another object is to provide a simple, economic method and system which utilizes ram-air for dispersing cluster-type payloads over a wide area.

Still a further object is to provide simple, reliable, and selectively operable free-fall system which utilizes ram-air to dispense a plurality of payload ladened modules, each of which, in turn, disintegrate under the effects of an impinging air stream for dispersing individual payloads in an in-line, cluster pattern.

Other objects, advantages and novel features of the invention will become apparent from the following detailed description of the invention when considered in conjunction with the accompanying drawings wherein:

FIG. 1 is a schematic view depicting an operation for the delivery system of the instant invention, whereby a plurality of payload retaining modules are dispensed from a module container and subsequently disintegrated;

FIG. 2 is a partial, cross sectional view of one modification of the module container shown in FIG. 1;

FIG. 3 is a partial cross sectional perspective view, of a single one of the loaded modules, shown in FIG. 2;

FIG. 4 is an end view of the module container, taken generally at 4 in FIG. 2;

FIG. 5 is a detail view, taken generally along lines 5—5 of FIG. 4, illustrating an arrangement for a spider and yoke, as provided for in the instant invention;

FIG. 6 is a diagrammatic view of an electrical circuit which may be utilized for initiating operation of the system of the instant invention;

FIG. 7 comprises another modification of the module container shown in FIG. 1;

FIG. 8 is a partially sectioned and exploded view of the module container of FIG. 7;

FIG. 9 is a cross sectional view, on an enlarged scale, taken generally along lines 9—9 of FIG. 7; and FIG. 10 comprises a partially sectioned view, on an enlarged scale, of the ogive fairing taken generally along lines 10—10 of FIG. 7.

Referring now to the drawings, wherein like reference characters designate like or corresponding parts throughout the several views, there is shown in FIG. 1 a transporting aircraft A having mounted thereon a module dispenser comprising an elongated container 10. The container 10 serves to transport a plurality of frangible modules 11, each having mounted therein a plurality of cluster-type payloads 12. The payloads 12 may comprise any one of many types of devices, however, as shown in the drawings, the payloads 12 comprise cylindrical grenades of a conventional design.

The container 10, FIG. 2, includes a cylindrical, smooth-surfaced liner 13 mounted within an outer shell 14 with a packing or insulating material 15 disposed therebetween. The forward or leading portion of the liner 13 is of a generally conical configuration and terminates at an elongated tubular ram-air metering orifice 16, which extends through the outer shell 14 at the leading end of the container 10. The orifice 16 serves as an air-scoop, whereby ram-air may be directed longitudinally through the liner 13 as the container is propelled through the atmosphere by the transporting aircraft A. Where desired, a frangible cover or "blow-out" disk or plate 17 may be inserted within the leading portion of the orifice 16 to serve as a fairing in order to prevent undesired ram-air from entering the liner 13. However, it is necessary to provide a means for positively removing the cover plate 17 when the system is to be actuated. Consequently, a small electrically initiated explosive charge 18, including a detonator therefor, may be provided and seated in the longitudinal wall of the orifice 16 and connected with the aircraft's power source through an electrical lead 18' connected between the charge and a terminal junction 19. The terminal 19 is connected directly to the aircraft's power source B, FIG. 6, through a normally open ARM and FIRE switch of conventional design.

The aft end of container 10 terminates in an opening 20 having an effective diameter at least as great as the diameter of the liner 13 so that loaded modules 11 may be inserted therethrough for loading the container 10, and subsequently dispensed therefrom. While various means may be employed for sealing the opening 20, it is necessary that the means employed be capable of functioning in a manner for positively retaining and then releasing the modules 11 at a desired instant in time. Therefore, a disk-shaped door or aft closure fairing 21 is mounted adjacent the opening through a pair of pivot arms 22 connected with the shell 14 by means of a pivot support 23. Pivot pins 24 serve to pivotally connect the pivot arms 22 with the support 23, consequently, the door 21 may be pivotally displaced between a fully opened and a fully closed disposition relative to the opening 20.

In order to retain the door 21 in a closed disposition, a spider, generally designated 25, is secured to the outer surface of the door 21 and is provided with a plurality of radially extending pivoted legs 26 the outer ends of which are operatively inserted in corresponding latching slots 27 for securing the door 21 closed. The slots 27 are formed at the internal surface of a ring 28. The ring 28 surrounds the opening 20 and is so shaped as to serve as a stop and latching block for the door 21.

Each leg 26 is pivotally secured near one end thereof to a centrally arranged yoke 29 and is further pivoted, near its center portion, to a pivot post 30, whereby imparted axial displacement of the yoke 29, relative to the container 10, will serve to cause each of the legs 26 to pivot at a post 30 for simultaneously withdrawing the ends of the legs 26 from slots 27. This withdrawal permits the door 21 to be pivoted at pins 24 outwardly and away from the opening 20.

The yoke 29 is provided with a central body 29a so formed as to permit the body to be telescoped over the outermost end of an anchor post 31. The innermost end of post 31 is secured to the center portion of the outer surface of the door 21 in a manner such that the body 29a extends outwardly at right angles with respect to the outer surface of the door. This mounting accommodates axial displacement so that the yoke 29 may be displaced for pivoting the legs 26. An electrically initiated explosive bolt 32, including an electrically initiated detonator of conventional design, is inserted through the yoke 29 and threaded axially into the extended end of the anchor post 31, and serves to secure the yoke to the post 31. Upon being initiated, the bolt 32 releases the yoke 29 so that it may be freely displaced with respect to the post 31. An electrical lead 32' serves to connect the bolt 32 with the terminal junction 19. Where desired, the charge of bolt 32 may be connected in circuit parallel with the charge 18, so that aircraft power may be applied thereto as the charge 18 is initiated in order to obtain a simultaneous activation of the two explosive devices 18 and 32 for thus affording an opening of both ends of the container 10 in a simultaneous and positive manner.

A pair of laterally extending spring loaded latch members 33 are mounted on the support 23 adjacent the path of the arms 22, and are adapted to be operatively cammed inwardly and away from the arms 22 as the door 21 is opened, by cam surfaces or beveled edges 34 formed on arms 22. This allows the door 21 to be fully opened and rested against a pair of stop pins 35 arranged within the support 23, FIG. 4. Once the arms 22 are forced past the latch members 33, a compression spring associated with the latch members 33 force the members outwardly into a locking engagement with the arms 22, whereby the door 21 is secured in a fully opened disposition.

Where desired, a fairing or spoiler 36 may be secured about the aft end of the shell 14 to obviate undesired airstream effects on the modules 11 are forced from the container 10 through the opening 20. A pair of conventional in-line attaching or bomb-rack lugs 37 may be secured to the shell 14 for supporting the container 10 from aircraft bomb racks, in order that the container may be supported in an operative disposition relative to an airstream generated once the aircraft becomes airborne.

The modules 11 are formed of a block of any suitable material, such as Styrofoam, for example. Each module 11 is provided with a selected number of receptacles 40 formed as pockets or wells within the module 11 and designed to receive selected payloads 12. Consequently, the modules 11 may be pre-loaded, at a remote location, with selected payloads 12 and stored within given containers 10. Since the modules 11 are pre-loaded with a plurality of payloads 12, the skill and time required to load a given aircraft A with selected payloads is minimized.

In loading a container 10, the pre-loaded modules 11 are inserted through the opening 20 and aligned in a mutually abutting and in-line relationship. Where desired, a displaceable spacer block 41 may be inserted within liner 13, ahead of the first-in-line module 11, in order to properly secure the modules 11 in place as the door 21 is closed and secured across the opening 20. Further, the leading surface of the block 41 may be utilized as a buffer surface for ram-air.

In operation, a pre-loaded and closed container 10 is secured, by the lugs 37, to an external bomb-rack of a transporting aircraft A. However, in the event the container 10 must be loaded while it is mated with the aircraft, the block 41 and the pre-loaded modules 11 are inserted through the opening 20 and the door 21 pivoted closed across the opening 20. The door 21 is secured in place by the spider legs 26 as the outermost ends of the legs are brought into a latching relationship with slots 27. The bolt 32 may now be inserted, for securing the yoke 29 to the post 31, and connected with the lead 32'. The explosive charge 18 is now inserted within the wall of the orifice 16 and connected with the lead 18'. The frangible "blow-out" plate 17 is now secured in place across the external opening of the orifice 16. The leads 18' and 32' may now be connected to the aircraft's power circuit through the terminal 19, which is isolated from the aircraft's electrical power circuit by means for the normally open ARM and FIRE switch located in the aircraft's cockpit.

Once the aircraft A is airborne over a target area an airstream of significant magnitude is caused to impinge against the plate 17. At a given instant in time, normally selected by the aircraft's pilot, the ARM and FIRE switch is closed, whereby a voltage is applied across the explosive devices 17 and 32 causing the plate 17 to rupture and/or be displaced from across opening of the orifice 16. At approximately the same instant, the spider yoke 29 is axially displaced relative to the container 10 as the explosive bolt 32 is fired. This displacement serves to draw the ends of the legs 26 from the latching slots 27. Immediately, the airflow or airstream is directed into the liner 13 and against the leading surface of the block 41 for applying a longitudinally directed displacing force against the first-in-line module 11. In the event the door 21 does not open as a consequence of the activation of the yoke 29, the door 21 is "knocked" away from the opening 20 as the modules 11 are displaced rearwardly. The door 21 is pivoted downwardly and latched open by the spring-loaded latches 33. The airstream, as it is directed through the orifice 16 acts as ram-air and forces the modules 11 through the opening 20, whereupon the airstream passing around the container 10 may now impinge against all external surfaces of the Styrofoam modules 11 and serve for causing the modules 11 to immediately "break up" and disintegrate. As the modules 11 "break up" the payloads 12 are released as they are torn from the receptacles 40 and allowed to fall toward the earth in a spread but in-line cluster pattern.

A modified module container and dispenser, as shown in FIGS. 7–10 of the drawings, may be utilized where it is found desirable to jettison the dispenser after the modules 11 have been ejected therefrom so that the delivering or transporting aircraft may be employed for other operations, unhindered by the effects imposed through transporting empty dispensers.

The dispenser or container 10 shown in FIGS. 7–10 comprises a light-weight, inexpensive body having a thin, cylindrical aluminum inner liner 50 surrounded by longitudinally displaced ribs 51 secured about the circumference thereof for imparting radial support thereto. Fixed to the ribs 51 is a plurality of spaced stringers or longerons 52, which extend the full length of the liner 50 and assists in imparting longitudinal rigidity thereto. A layer 53 of thermosetting plastic is formed about the liner, ribs and longerons and serves as an insulating material for protecting the liner 50 against heat and impact.

The lugs 37 are set in a strong-back formed by a thickened portion of the layer 53 and, preferably, are secured to a pair of the ribs 51. The external surface of the layer 53 is protected by a layer 54 of bonded fiberglass applied about the dispenser 10 with a conventional wrapping technique.

The forward end of the dispenser 10 is sealed by means of an ogive fairing 55, secured about the end of the dispenser 10 and formed of a thermosetting plastic material. A metering orifice 16, including a metering orifice ring 56 axially aligned therein, extends longitudinally therethrough for directing a portion of the airstream into the dispenser. The aforementioned cover plate 17 may be eliminated as the diameter of the orifice 16 and ring 56 serves to limit the passage of the airstream therethrough to a compatible quantity with a tolerant force. The aft end of the dispenser 10 is sealed by means of a plastic ogive fairing 57, fixed thereto in any suitable manner, such as, for example, a break-away hinge and snap-locks, not designated.

The base 57a of the ogive 57 is provided with an internal diameter equivalent to that of the liner 50 and includes stop members 58, which serves to abut the modules 11 when the ogive is locked in a sealing relationship with respect to the liner 50.

Imbedded within the base 57a of the fairing 57 there is an electrically initiated flexible line-charge 59, of a type such as a pyro-fuze or Primacord for example, which surrounds the circumference of the base. The line-charge 59 may be initiated for severing the fairing 57 from the dispenser 10, in order for the modules 11 to be ejected from the liner 50. A male plug 60 and a female plug 61 serve to connect the charge 59 with a power circuit including a circuit lead 62 and the aircraft power circuit connected terminal junction plug 19.

With this construction, as illustrated in FIGS. 7-10, the dispenser may be actuated by closing the ARM and FIRE switch for initiating the line charge 59 and severing the ogive fairing 57 from the dispenser so that the portion of the airstream directed through the orifice 16 may now serve to eject the modules from the dispenser 10.

As the construction of the dispenser is very economical, the pilot may eject the dispenser from the transporting aircraft after it has served a one-time function. Furthermore, when employing the ogive fairing 57 at the aft end of the dispenser 10, the aerodynamic drag imposed on the transporting aircraft is substantially reduced. Also, it will be appreciated that when employing the dispenser illustrated in FIGS. 7-10, the weight factor is substantially reduced, whereby the handling and transporting of the dispenser is greatly enhanced.

In view of the foregoing, it is to be understood that the present invention provides a simple and efficient method, and system for performing the method, which may be effectively utilized for delivering cluster-type payloads, and which provides for the rapid loading of transporting aircraft with a variety of payloads.

Obviously many modifications and variations of the present invention are possible in the light of the above teachings. It is therefore to be understood that within the scope of the appended claims the invention may be practiced otherwise than as specifically described.

What is claimed is:

1. Apparatus for sequentially delivering from an airplane, along its direction of flight, a plurality of modules, each containing a plurality of payloads, comprising:
    (a) a cylindrical tube adapted to be carried by the airplane with its longitudinal axis disposed in the direction of flight of the airplane,
    (b) an openable closure disposed at the rear end of the tube,
    (c) a plurality of cylindrical modules disposed in axial abutting relation and slideably fitted within the tube and substantially filling same between its ends,
    (d) each module being of a frangible material, such as styrofoam, adapted to disintegrate after it leaves the tube and when subjected to the airstream of the airplane,
    (e) each module having a plurality of parallel apertures extending substantially between opposite ends thereof, said apertures forming voids within the major portion of the volume of a module,
    (f) each void containing a payload,
    (g) an ogive fairing at the forward end of the tube having a central circular aperture therein of a cross sectional area considerably smaller than the cross sectional area of the tube, forming a metering orifice through which ram air may enter the tube,
    (h) a space disposed between the rear end of the aperture and the most forwardly disposed module, forming a chamber in which ram air may diffuse and increase in static pressure, for urging the modules rearwardly and out of the tube at a desired rate, dependent upon the rate at which ram air may enter said orifice, whereby the sequential delivery of the modules along the line of flight of the airplane may be predetermined, and
    (i) means for opening said closure.

2. Apparatus in accordance with claim 1 wherein said closure is formed as an ogive fairing at the rear end of the tube.

3. Apparatus in accordance with claim 2 including a circumferentially extending flexible line charge imbedded within the ogive fairing, adjacent its juncture with the tube, adapted to explode and shear it from the rear end of the tube.

References Cited by the Examiner

UNITED STATES PATENTS

| | | | |
|---|---|---|---|
| 2,714,999 | 8/1955 | Thieblot et al. | 244—137 X |
| 2,723,093 | 11/1955 | Price et al. | 244—137 |
| 2,730,402 | 1/1956 | Whiting et al. | 244—136 X |
| 2,809,583 | 10/1957 | Ortynsky et al. | 102—7.2 |
| 2,954,948 | 10/1960 | Johnson | 244—136 |
| 3,095,814 | 7/1963 | Jansen et al. | 102—34.4 X |
| 3,140,013 | 7/1964 | Schecter | 244—136 X |
| 3,172,330 | 3/1965 | Lidmalm et al. | 89—1.817 |
| 3,264,985 | 8/1966 | Reed | 102—7.2 X |

BENJAMIN A. BORCHELT, *Primary Examiner.*

SAMUEL W. ENGLE, *Examiner.*